(12) United States Patent
Gibson et al.

(10) Patent No.: US 9,256,576 B2
(45) Date of Patent: Feb. 9, 2016

(54) ASSISTED DIRECT START AND ACTIVE SUSPENSION INTEGRATION CONTROL

(71) Applicants: Alex O'Connor Gibson, Ann Arbor, MI (US); Jeffrey A. Doering, Canton, MI (US); Jianbo Lu, Livonia, MI (US); Eric H. Tseng, Canton, MI (US)

(72) Inventors: Alex O'Connor Gibson, Ann Arbor, MI (US); Jeffrey A. Doering, Canton, MI (US); Jianbo Lu, Livonia, MI (US); Eric H. Tseng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/672,194

(22) Filed: Nov. 8, 2012

(65) Prior Publication Data

US 2014/0129083 A1     May 8, 2014

(51) Int. Cl.
*B60G 17/018*     (2006.01)
*B60G 23/00*      (2006.01)
(Continued)

(52) U.S. Cl.
CPC ............. *G06F 17/00* (2013.01); *B60G 17/016* (2013.01); *B60G 17/0182* (2013.01); *B60G 17/0195* (2013.01); *B60G 99/00* (2013.01); *B60W 10/06* (2013.01); *B60W 10/22* (2013.01); *B60W 30/1886* (2013.01); *B60W 30/192* (2013.01); *F02N 15/00* (2013.01); *B60G 2202/413* (2013.01); *B60G 2202/414* (2013.01); *B60G 2400/30* (2013.01); *B60G 2400/821* (2013.01); *B60G 2400/90* (2013.01); *B60G 2401/16* (2013.01); *B60G 2500/10* (2013.01); *B60G 2500/30* (2013.01); *B60G 2600/042* (2013.01);
(Continued)

(58) Field of Classification Search
CPC .... B60G 17/017; B60G 17/018; B60G 99/00; B60G 17/016; B60G 17/0182; B60G 17/0195; B60G 2202/413; B60G 2202/414; B60G 2400/30; B60G 2400/821; B60G 2400/90; B60G 2401/16; B60G 2500/10; B60G 2500/30; B60G 2600/042; B60G 2600/82; B60G 2600/73; B60G 2800/07; G06F 17/00; F02N 15/00; B60W 10/22; B60W 10/06; B60W 30/192; B60W 30/1886
USPC ........................................................ 701/37
See application file for complete search history.

(56) References Cited

U.S. PATENT DOCUMENTS

| 5,660,411 A | 8/1997 | Yoon |
| 6,389,341 B1* | 5/2002 | Davis .............................. 701/37 |
| 6,397,133 B1* | 5/2002 | van der Pol et al. ............ 701/37 |
| 6,512,971 B2* | 1/2003 | Koumura et al. ............... 701/51 |

(Continued)

FOREIGN PATENT DOCUMENTS

| KR | 2002017783 A | 3/2002 |
| WO | WO 2010069440 A1 | 6/2010 |
| WO | WO 2011058127 A1 | 5/2011 |

OTHER PUBLICATIONS

Active Geometry Control Suspension System for the Enhancement of Vehicle Stability U K Lee, S H Lee, C S Han, K Hedrick, A Catala, Jun. 1, 2008 http://pid.sagepub.com/content/222/6/979.abstract.

*Primary Examiner* — James Trammell
*Assistant Examiner* — Frederick Brushaber
(74) *Attorney, Agent, or Firm* — L.C. Begin & Associates, PLLC

(57) ABSTRACT

A system for controlling an internal combustion engine. The system includes engine shutdown/restart means and energy storage means configured for supplying power to an associated active vehicle suspension system when the engine is shut down. A controller is configured for controlling the shutdown/restart means responsive to an energy state of the energy storage means.

19 Claims, 8 Drawing Sheets

(51) Int. Cl.

| | |
|---|---|
| *G06F 17/00* | (2006.01) |
| *B60G 99/00* | (2010.01) |
| *F02N 15/00* | (2006.01) |
| *B60G 17/016* | (2006.01) |
| *B60G 17/0195* | (2006.01) |
| *B60W 10/22* | (2006.01) |
| *B60W 30/192* | (2012.01) |
| *B60W 10/06* | (2006.01) |
| *B60W 30/188* | (2012.01) |

(52) U.S. Cl.
CPC ....... *B60G 2600/182* (2013.01); *B60G 2600/73* (2013.01); *B60G 2800/70* (2013.01); *B60G 2800/85* (2013.01); *B60G 2800/91* (2013.01); *B60G 2800/97* (2013.01)

(56) References Cited

U.S. PATENT DOCUMENTS

| | | | |
|---|---|---|---|
| 6,912,452 B2 | 6/2005 | Sakamoto | |
| 7,552,705 B2 | 6/2009 | Serkh | |
| 2007/0124037 A1* | 5/2007 | Moran | 701/22 |
| 2007/0158920 A1* | 7/2007 | Delaney | 280/5.514 |
| 2008/0147260 A1* | 6/2008 | Moran | 701/22 |
| 2008/0177434 A1* | 7/2008 | Moran | 701/22 |
| 2009/0088918 A1* | 4/2009 | Takenaka et al. | 701/29 |
| 2009/0254246 A1* | 10/2009 | Yang et al. | 701/36 |
| 2010/0039054 A1* | 2/2010 | Young et al. | 318/376 |
| 2010/0145562 A1* | 6/2010 | Moran | 701/22 |
| 2010/0204885 A1* | 8/2010 | Kajino et al. | 701/37 |
| 2011/0017533 A1* | 1/2011 | Bissontz | 180/65.25 |
| 2011/0071746 A1 | 3/2011 | O'Connor Gibson | |
| 2011/0109744 A1* | 5/2011 | Kuehnle et al. | 348/148 |

\* cited by examiner

ASSISTED DIRECT START AND ACTIVE SUSPENSION INTEGRATION CONTROL

TECHNICAL FIELD

The present disclosure relates to systems and methods for enabling automatic shut down and restart of an internal combustion engine in a vehicle incorporating an active suspension system.

BACKGROUND OF THE INVENTION

An assisted direct start (ADS) engine may use a number of factors to determine when to shut down and restart the engine to achieve the goal of reducing fuel consumption and emissions while the vehicle is stationary. Typically, the engine is shut down when wheel speed is zero and the brake pedal is depressed (for automatic transmissions), or when the transmission is in neutral and the clutch pedal is released (for manual transmissions). Other considerations for determining when the engine should be shut down may include the engine coolant temperature, battery state of charge (SOC), fuel rail pressure, A/C operation, and other considerations that may be used to prevent an engine shut down and/or to initiate an engine restart.

In some markets where assisted direct start, ADS, or stop/start (S/S) systems will soon be common for example, in European markets) active suspension systems (e.g. full hydro-pneumatic suspension systems with actuators at each wheel and/or roll control systems with front and/or rear actuation) are becoming increasingly popular. However, because the power required for operating the active suspension system comes from the engine, shutdown of the engine during S/S engine shutdown events may impair or prevent operation of elements of the suspension system at a time when the suspension is needed for optimum vehicle control. This is especially the case for rolling stop/start (RSS) events that occur when the operator is not depressing the accelerator pedal and the vehicle speed is below a threshold, typically a value greater than "zero" (for example, 60 KPH).

Therefore, in vehicles incorporating both ADS and active suspension systems, a need exists for some method of integrating the two systems to help ensure that active suspension, system operation is not compromised during RSS or S/S engine shutdown events.

SUMMARY OF THE INVENTION

In one aspect of the embodiments of the present invention, a system is provided for controlling an internal combustion engine. The system includes engine shutdown/restart means, energy storage means configured for supplying power to an associated active vehicle suspension system when the engine is shut down; and a controller configured for controlling the shutdown/restart means responsive to an energy state of the energy storage means.

In another aspect of the embodiments of the present invention, a system is provided for controlling a vehicle active suspension system during engine shutdown. The system includes an energy storage means structured for powering actuation of the active suspension system during shutdown, and a controller operatively coupled to the energy storage means and structured for controlling actuation of the suspension system during shutdown.

In another aspect of the embodiments of the present invention, a method is provided for controlling a vehicle active suspension system during engine shutdown. The method includes steps of determining an estimated energy requirement of the suspension system during shutdown, determining a stored energy state of the vehicle, comparing the estimated requirement to the stored energy state, and controlling shutdown of the engine responsive to a difference between the estimated requirement and the stored energy state.

DETAILED DESCRIPTION

Figure 1:
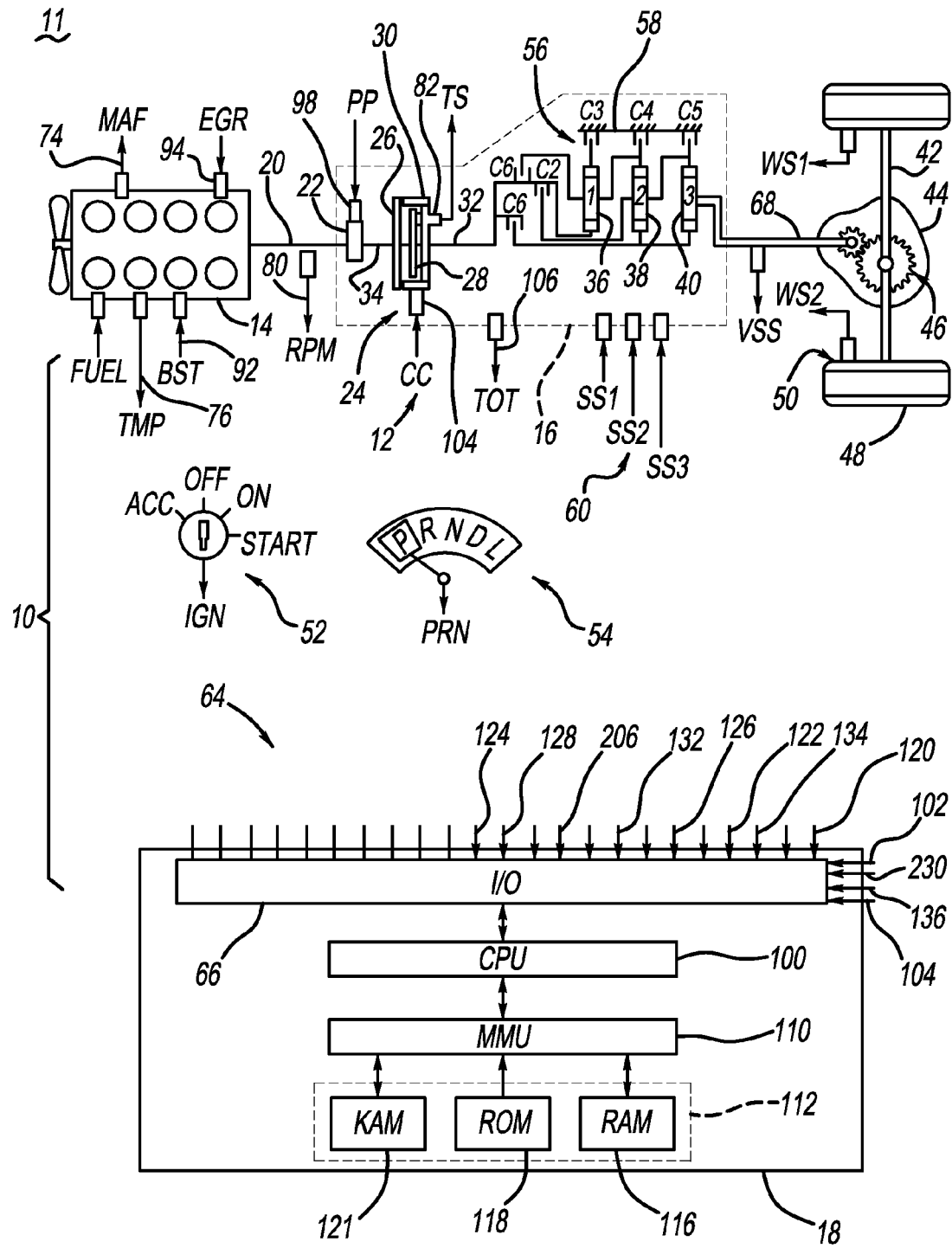
FIG. 1 is a block diagram illustrating a representative vehicle incorporating a system for supplying power for operation of an active suspension system during engine shutdown, in accordance with one embodiment of the present invention.

Similar elements incorporated into the various embodiments of the systems described herein have been given similar reference numerals.

As those of ordinary skill in the art will understand, various features illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of this disclosure may be desired for particular applications or implementations.

FIG. 1 is a schematic diagram illustrating a vehicle 11 incorporating an integrated ADS and active suspension control system 10 in accordance with an embodiment of the present invention. In this embodiment, system 10 includes a vehicle powertrain 12 having an internal combustion engine 14 coupled to an electronically controlled fully or semi-automated transmission 16. The teachings of the present disclosure may also be applied to applications where powertrain 12 includes a manual transmission. Vehicle 11 also includes a controller 18 in communication with engine 14, transmission 16, a vehicle active suspension system (not shown in FIG. 2), and other vehicle systems and elements for providing various information and control functions. As previously described, those of ordinary skill in the art will appreciate that control functions performed by controller 18 may be divided between or among dedicated engine, transmission, and/or other component controllers depending upon the particular application and implementation. For multiple controller applications, the controllers may communicate using a standard data bus or via signal wires, for example, to exchange information relative to engine and transmission control consistent with the teachings of the present disclosure to anticipate vehicle launch and control automatic shutdown/restart in response.

Engine 14 is connected to transmission 16 via crankshaft 20 which is connected to transmission pump 22 and/or torque converter 24. In one embodiment, torque converter 24 is a hydrodynamic torque converter including a pump or impeller 26 which is selectively fluidly coupled to a turbine 28. Torque converter 24 may also include a frictional converter clutch or bypass clutch 30 which provides a selective frictional coupling between turbine shaft 32 and input shaft 34. Although transmission 16 is depicted as a fully automatic electronically controlled transmission with a torque converter, the present disclosure applies to applications having other types of fully automatic, semi-automatic, or manual transmissions that may or may not include a torque converter.

Transmission 16 is generally of conventional design and may include various input-to-output ratios or gear ratios effected by various gears or gearsets, indicated generally by reference numerals 36, 38, and 40 and associated frictional elements such as clutches (C1-C6), bands, and the like, represented generally by reference numeral 56 as well known in the art. Gears 36, 38, and 40 in combination with torque converter 24 provide selective reduction or multiplication ratios between turbine shaft 32 and output shaft 68 based on engagement or activation of appropriate clutches C1-C6. Transmission 16 may be electronically controlled via one or more shift solenoids, indicated generally by reference numeral 60, to select or engage one or more gear ratios and provide information to controller 18 with respect to the current gear ratio.

Depending upon the particular application, output shaft 68 may be coupled to one or more axles 42 via a final drive reduction or differential 44 which may include one or more gears, as indicated generally by reference numeral 46. Each axle 42 may include two or more wheels 48 having corresponding wheel speed sensors 50, with one or more front wheels also having associated steering angle sensors 208 (FIG. 1). Although a rear wheel drive application is illustrated, the present disclosure is independent of the particular powertrain arrangement and is applicable to various other types of powertrains, including but not limited to front wheel drive and all-wheel drive applications.

Powertrain 12 includes a plurality of sensors and actuators, indicated generally by reference numeral 64, in communication with corresponding input/output (I/O) ports 66 of controller 18 to sense or monitor the current operating and ambient conditions of powertrain 12 and other vehicle systems and elements, specifically the elements comprising and operatively coupled to the vehicle active suspension system. Controller 18 controls the automatic shutdown/restart operation of engine 14 in response to the estimated energy requirements of the active suspension system based on road conditions ahead of the vehicle.

While the particular sensors and actuators 64 may vary depending upon the application and implementation, one representative system 10 includes a mass air flow sensor (MAF) 74 that provides an indication of the air mass flowing through the engine intake. A temperature sensor (TMP) 76 provides an indication of the engine coolant temperature, or alternatively engine oil temperature. An engine speed sensor (RPM) 80 monitors rotational speed of crankshaft 20. Similarly, a turbine speed sensor (TS) 82 monitors the rotational speed of the turbine 28 of torque converter 24. Another rotational speed sensor, vehicle speed sensor (VSS) 84, provides an indication of the speed of output shaft 68 which may be used to determine the vehicle speed based on the ratio of differential 44 and the size of wheels 48. Of course, wheel speed sensors (WS1 and WS2) 50 may be used to provide an indication of the vehicle speed as well.

An ignition switch 52 or similar device may be provided to control initial starting and running of engine 14 and various vehicle accessories by an appropriate signal or signals provided directly to various corresponding engine components (such as a starter motor, for example), and/or signals processed through or generated by controller 18. Ignition switch 52 provides a request for engine shutdown to controller 18 when turned to the "off" position. However, the assisted direct start feature, also referred to as the ADS feature, may also shut down the engine when switch 52 is in the "ON" position to improve fuel economy and reduce emissions under certain vehicle and ambient operating conditions. However, automatic restart will not be performed with switch 52 in the "OFF" position.

Various actuators 64 are used to provide control signals or to effect movement of various devices in powertrain 12. Actuators 64 may include actuators for timing and metering fuel (FUEL) 90, which may include a fuel pump and/or at least one electronically controlled fuel injector to provide direct or port fuel injection to the engine cylinders, for example, to automatically restart engine 14 when required. Actuators may also be used to control turbocharger boost pressure 92 (BST) and for setting the amount of exhaust gas recirculation (EGR) 94 for engines so equipped. Multiple cylinder internal combustion engine 14 may be a spark-ignition or compression-ignition engine depending on the particular application. Spark-ignition engines may include alternate or additional sensors, actuators, and drivers, such as those used to control spark timing and throttle valve position, for example. Automatic transmission 16 may be selectively regulated by controlling transmission pump or line pressure using an appropriate actuator (PP) 98 in combination with shift solenoids (SS1, SS2, and SS3) 60 which are used to select an appropriate gear ratio. Automatic transmission 16 may include a torque converter clutch 30 operable via an appropriate actuator or solenoid (CC) 104. A temperature sensor 106 may be provided to determine the transmission oil temperature (TOT).

Figure 2:
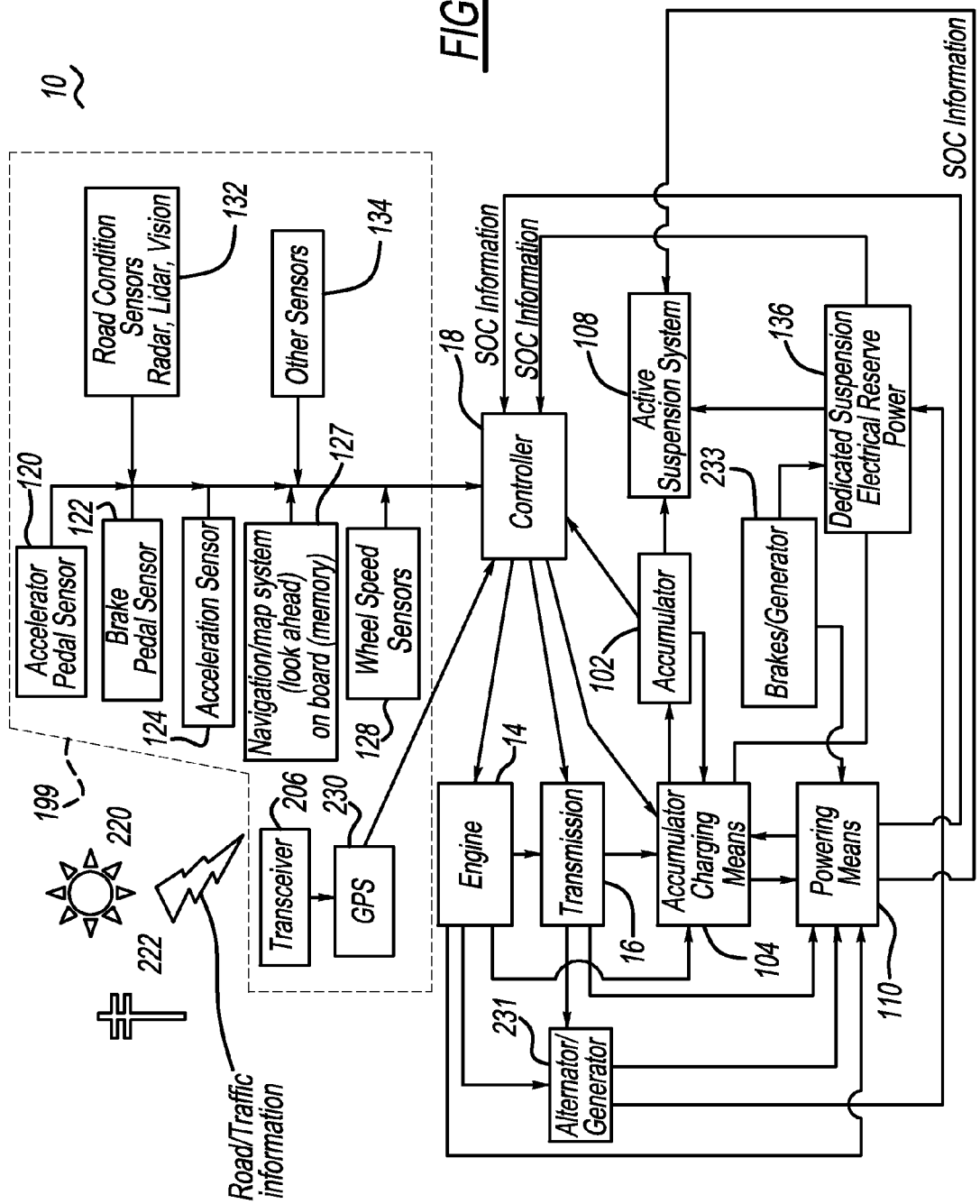
FIG. 2 is a schematic diagram of one embodiment of a system for supplying power for operation, during engine shutdown, of an active suspension system powered by a closed center hydraulic system using an electrically-powered pump, in accordance with one embodiment of the present invention.

Referring now to FIGS. 1 and 2, as previously discussed, controller 18 processes signals received from various sensors and generates signals to various actuators to control vehicle 12. Controller 18 represents one or more physical controllers that may be separate or integrated and may share control and diagnostic functions. For example, controller 18 may represent a vehicle controller, powertrain controller, engine controller, transmission controller, and/or a dedicated subsystem controller, such as an anti-lock braking system (ABS) controller, active suspension system controller, etc. Various controllers may communicate diagnostic and control information to one or more other controllers depending on the particular application and implementation.

In one embodiment, controller 18 is a programmable controller implemented by a microprocessor-based controller or computer in the illustrated embodiments that provides integrated control of engine 14 and transmission 16 of vehicle 12. The embodiments of the present invention may be implemented using separate engine and transmission controllers that communicate appropriate parameters to provide coordinated control of the engine shutdown and restart process to improve launch performance. In one embodiment, controller 18 has a microprocessor 100 or central processing unit (CPU), in communication with memory management unit (MMU) 110. MMU 110 controls the movement of data among the various computer readable storage media 112 and communicates data to and from CPU 100. The computer readable storage media may include volatile and nonvolatile storage in read-only memory (ROM) 118, random-access memory (RAM) 116, and keep-alive memory (KAM) 121, for example. KAM 121 may be used to store various operating variables while CPU 100 is powered down. The computer-readable storage media 112 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 100 in controlling system 10. The computer-readable storage media 112 may also include floppy disks, CD-ROMs, hard disks, and the like.

According to the present disclosure, controller 18 controls vehicle 12, which includes an internal combustion engine 14 (FIG. 2) operatively coupled to the controller 18 and having automatic shut down and restart capability. Based on the results of receiving and/or processing various inputs, controller 18 generates various control commands to engine 14, including commands initiating a shut down of the engine under certain conditions and commands preventing a shut down of the engine under other conditions. The controller is also configured to issue control commands shutting down the engine responsive to detection of at least one first predetermined condition, and commands directed to restarting the engine responsive to detection of at least one second predetermined condition following the at least one first predetermined condition.

In a manner known in the art, engine 14 provides power usable for various vehicle functions, including operation of a hydraulically actuated active vehicle suspension system (generally designated 108). While the interactions among all actuatable vehicle systems are of interest, the embodiments of the present invention focus primarily on the active suspension system elements affecting such characteristics as suspension travel or height, suspension damping, suspension stiffness, and suspension force. The suspension element actuations are adaptive to known or estimated road conditions based on information stored in a digital map of the portion of road surface ahead of the vehicle, on information received by a vehicle GPS operatively coupled to the controller 18 or received from another source external to the vehicle, on road condition information generated by on-board vehicle systems (for example, road condition sensors and/or associated means for processing the road condition sensor data), and/or on road condition received from any suitable source.

The term "open-center" as applied to the hydraulic systems described herein refers to a system wherein the hydraulic pressure for actuating elements of the suspension system is provided by a constant flow of hydraulic fluid through one or more controllable orifices (for example, as provided by a valve). The term "closed-center" as applied to the hydraulic systems described herein refers to a system wherein a pump pressurizes a hydraulic accumulator. Feedback from the accumulator is used to control the pump speed or flow rate, and a hydraulic valve controls the flow out of the accumulator to the suspension system actuatable elements or actuators. Pressure/force or displacement/speed feedback from the actuator(s) may be used to control flowrate through the valve from the accumulator.

FIG. 2 is a schematic diagram of a system for supplying power for operation, during engine shutdown, of an active suspension system powered by a closed center hydraulic system, in accordance with one embodiment of the present invention.

In one embodiment, the active suspension system is a hydraulically-actuated closed center system utilizing an energy-storage means in the form of a hydraulic accumulator 102 (or multiple accumulators) to maintain sufficient pressure in the hydraulic system for operation of the hydraulically-actuated elements of the active suspension system during an engine shutdown. The system also employs an accumulator charging means operatively coupled to the accumulator for pressurizing the hydraulic fluid stored in the accumulator. In a known manner, hydraulic accumulator 102 serves as a storage reservoir containing hydraulic fluid under pressure. An embodiment of such a system is shown schematically in FIG. 2. The energy capacity of the accumulator(s) 102 can be sized relative to the demands of the active suspension system actuatable elements 108 to allow the accumulator charging means 104 to be turned off for a sufficient period to allow the engine to be shut-down and restarted, without compromising the ability of the active suspension accumulator(s) to maintain sufficient pressure to actuate the suspension system elements as required.

In one embodiment, the accumulator charging means includes an electrically powered pump (not shown) coupled to the one or more hydraulic accumulators 102 for charging the accumulator(s). Embodiments of the accumulator charging means described herein may also include any valving or other mechanisms or elements needed for operating the charging means in accordance with instructions from an associated controller.

The accumulator charging means is also operatively coupled to a powering means 110 to provide power for operating the accumulator charging means during engine shutdown and (optionally) also while the engine is running. In one particular embodiment, the powering means includes a motor/generator operatively coupled to the accumulator charging means 104 and to engine crankshaft 20 or to another rotating shaft or element of the vehicle (for example, a shaft disengageably coupled to the crankshaft using a clutch or similar mechanism). The powering means may be operatively coupled to (and powered by) either or both of the engine 14 and transmission 16.

In a particular embodiment, the motor/generator is operatively and detachably coupled to a rotatable element of the vehicle transmission 16 or to another element of the vehicle that will continue rotating for a period of time after engine shutdown, so that the generator can be powered by the inertia of the rotating element when the engine is shut down. The motor/generator converts energy from the rotating shaft or element to electricity for powering the pump. The pump is configured for pressurizing hydraulic fluid to charge or pressurize the accumulators 102.

In one particular embodiment, the motor/generator 231 is the conventional alternator included in the vehicle. In another particular embodiment, the motor/generator 231 is a separate alternator or generator. In another particular embodiment, the powering means includes an electrical energy storage means (generally designated 110) operatively coupled to the electrically powered pump. The pump receives electric power for pressurizing the accumulators 102 from the electrical energy storage means.

The electrical energy storage means may be coupled to the accumulator charging means 104 to provide electrical power sufficient to operate the accumulator charging means 104 for a period of time after engine shutdown. The electrical energy storage means 110 is connected to the controller 18 so as to enable a status of charge (SOC) of the electrical energy storage means to be conveyed to the controller. In a particular embodiment, the electrical energy storage means is also operatively coupled to one or more electrically actuatable elements of the active suspension system, for providing actuation power to these elements during engine shutdown.

In one particular embodiment, the electrical energy storage means 110 comprises the vehicle 12 volt battery. In another particular embodiment, the electrical energy storage means 110 comprises a separate battery. In another particular embodiment, the electrical energy storage means comprises a suitable capacitor based storage device or devices, such as one or more ultracapacitors. Alternatively, combinations of batteries and capacitor-based storage devices may be used.

In one particular embodiment, the electrical energy storage means is operatively coupled to one or more electric generators (such as a conventional vehicle alternator 231, for example) which may be powered by a rotating element of the transmission, one or more vehicle wheel shafts, or by any other suitable means when the engine is shut down. In this manner, any associated vehicle electrical energy storage means may be recharged in a known manner using motion of vehicle components other than the engine while the engine is shut down.

In one particular embodiment, one or more of the electric generator(s) incorporated into the vehicle form part of a regenerative braking system. When the brakes are applied to slow the vehicle, the generator(s) coupled to the wheels generate current usable for recharging an associated vehicle electrical energy storage means.

In one embodiment, a dedicated suspension reserve electrical power supply 136 similar to electrical energy storage means 110 is provided for powering the active suspension system while the engine is shut down. Unlike energy storage means 110 which may include elements (for example, the vehicle 12 volt battery) used to power other portions of the vehicle, power supply 136 is dedicated to powering electrically powerable elements (including electrically-powered hydraulic pumps, for example) of the active suspension system when the engine is shut down. Power supply 136 may be charged by any of (or all of) the same elements as (and in the same manner as) electrical energy storage means 110. For example, power supply 136 may be operatively and detachably coupled (via an alternator/generator 231, for example) to a rotatable element the vehicle transmission 16, so that the power supply can be energized by the inertia of the rotating element when the engine is shut down. Alternatively, the power supply 136 may be charged by accumulator charging means 104, by generator(s) operatively coupled to the vehicle brakes, or by any other suitable means. Feedback from the accumulator 102 indicative of the accumulator pressure may be used by the controller in controlling the speed and/or flow rate of the pump supplying pressurized fluid to the accumulator. In this manner, the accumulator charging means 104 may be activated (for example, when the accumulator pressure falls below a predetermined threshold) or deactivated as desired.

In a particular embodiment, the accumulator charging means includes a constant displacement pump, and charging of the accumulator is managed using feedback from the accumulator to control the powering means 110, thereby controlling the speed and/or flow rate of the pump supplying pressurized fluid to the accumulator. For example, in an embodiment where the powering means includes a motor/generator, the speed of the motor/generator would be controlled to control the speed and/or flow rate of the pump supplying pressurized fluid to the accumulator.

In one particular embodiment, the accumulator pressure feedback is provided to controller 18, which generates a suitable control signal to the powering means 110. In another particular embodiment, the accumulator feedback is provided to a control mechanism (not shown) separate from controller 18 and operatively coupled to the powering means 110, which adjusts the powering means 110 responsive to the accumulator pressure feedback.

In the embodiments of the present invention, any backup energy storage means (such as accumulator 18 in the embodiment just described) may be coupled to the suspension actuatable elements using any of a variety of backup powering schemes, according to the design of a particular vehicle and other requirements of a particular application. FIGS. 7A-7D show schematic representations of various backup powering schemes usable in embodiments of the present invention.

Figure 7A:
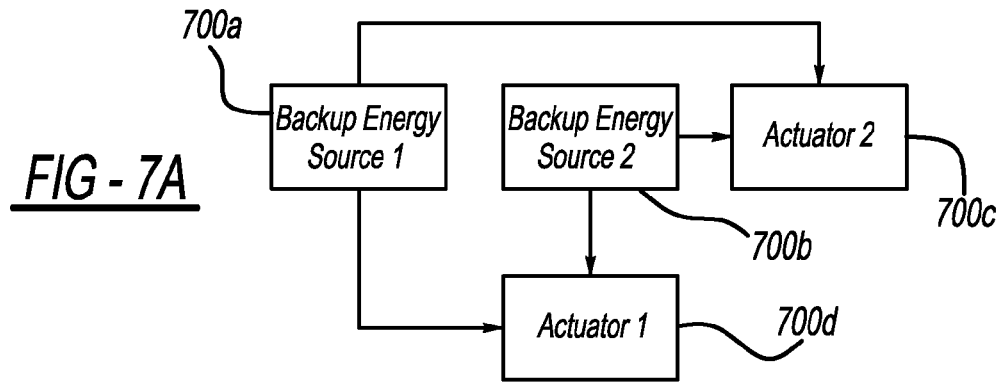
FIGS. 7A-7D show schematic representations of various backup powering schemes usable in various embodiments of the present invention.

In FIG. 7A, multiple backup energy storage means 700a and 700b are provided, with each source operatively coupled to more than one actuator or actuatable element (in this case, elements 700c and 700d) so that each backup energy storage means is capable of providing power to more than one element. Thus, in this scheme, any of the actuatable elements 700c and 700d are configured to receive backup energy from multiple energy storage means.

Figure 7B:
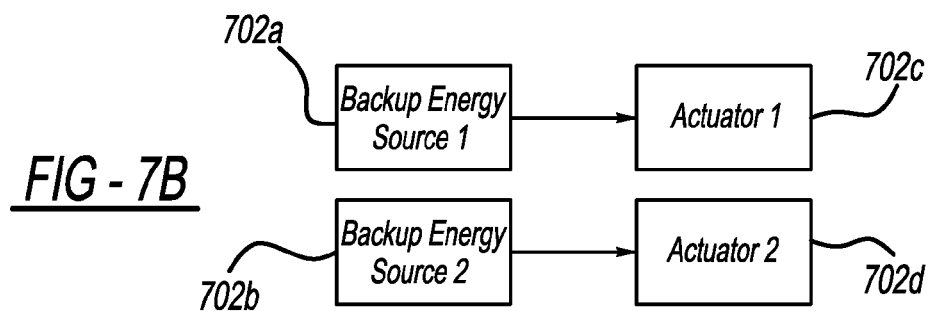

In FIG. 7B, each of backup energy storage means 702a and 702b is dedicated to providing backup power to a particular associated actuator or actuatable element 702c and 702d, respectively.

Figure 7C:
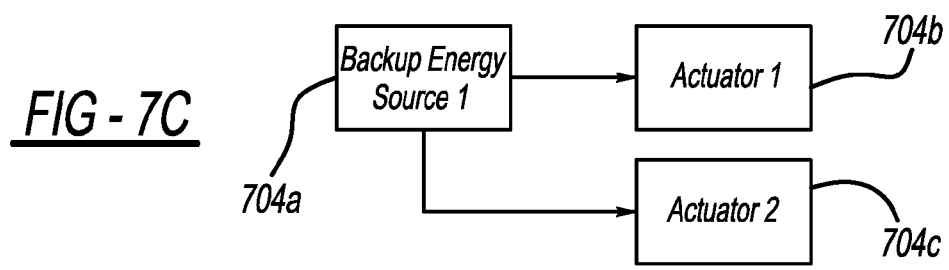

In the scheme shown in FIG. 7C, a single backup energy storage means 704a powers multiple actuators or a group of actuators 704b and 704c. An example of this scheme is shown in FIG. 2 in an embodiment incorporating a single accumulator, where the accumulator provides backup energy to all of the hydraulically actuatable suspension system elements.

Figure 7D:
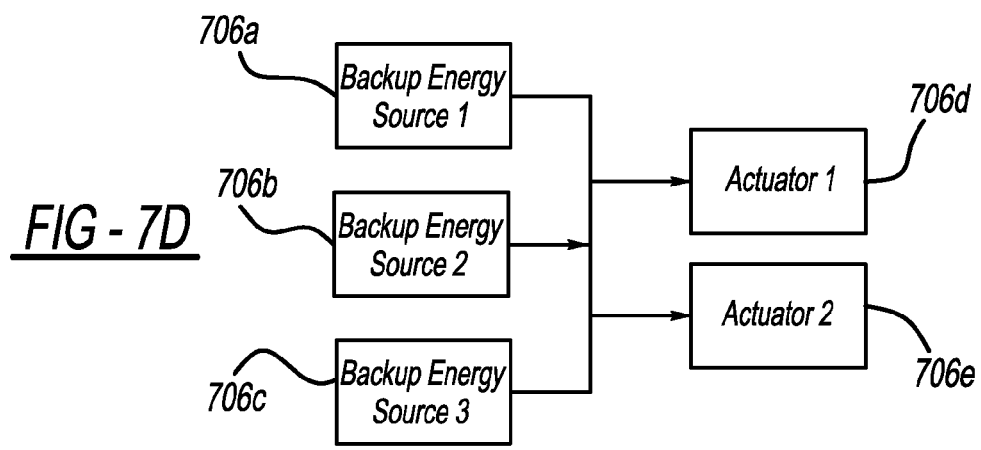

In FIG. 7D, multiple backup energy storage means 706a-c are provided, with all of the energy storage means operatively to multiple actuators 706d and 706e (or a group of actuators), such that any given actuator can draw power from any or all of the energy storage means.

In cases where a backup energy storage means is configured to provide energy to any of multiple actuatable elements, the controller may implement an energy distribution priority plan in an emergency situation or in instances where the total energy demand on a particular backup energy storage means exceeds the estimated demand.

Figure 3:
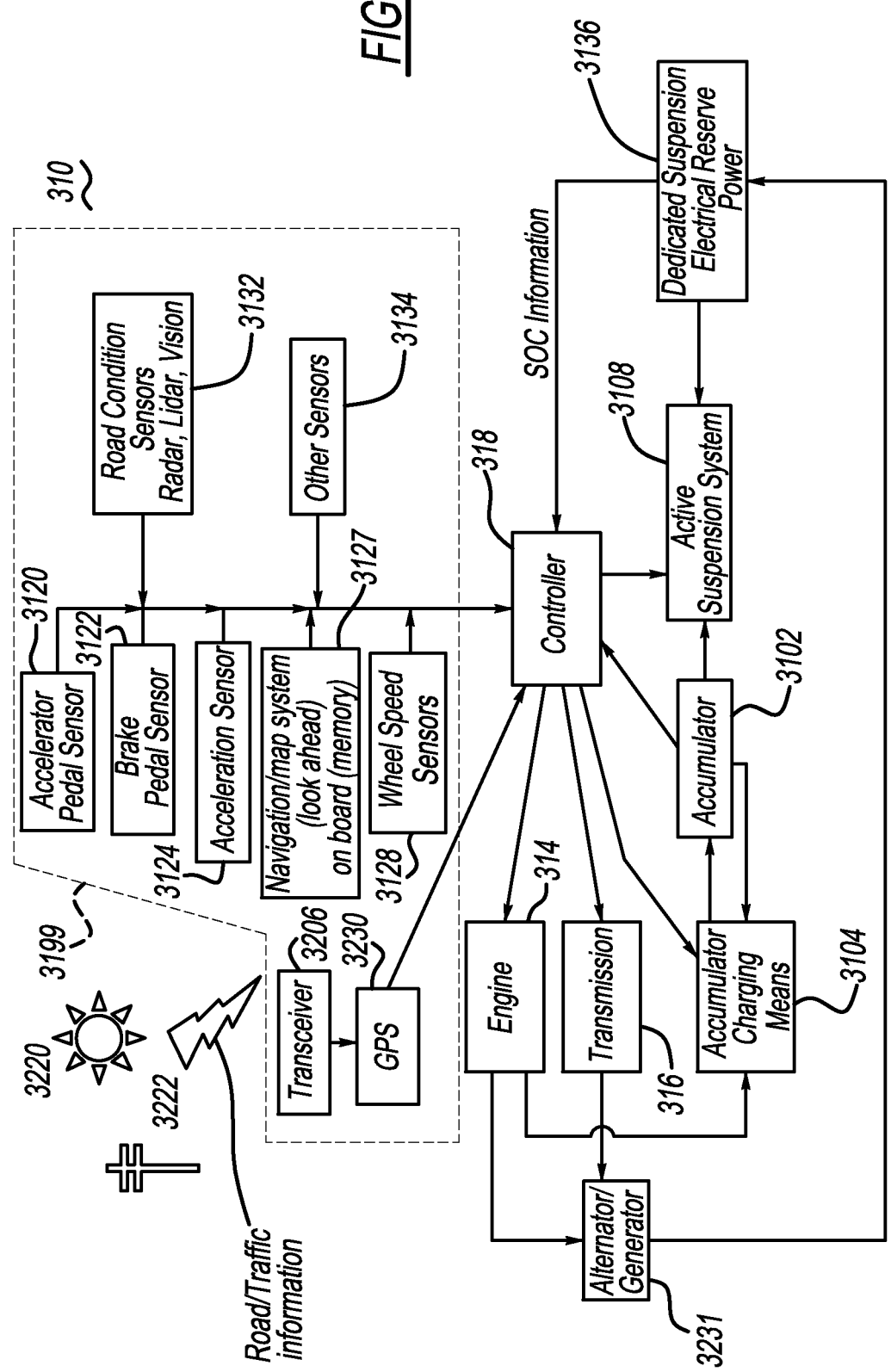
FIG. 3 is a schematic diagram of one embodiment of a system for supplying power for operation, during engine shutdown, of an active suspension system powered by a closed center hydraulic system using a mechanical pump, in accordance with one embodiment of the present invention.

FIG. 3 is a schematic diagram of another embodiment 310 of a system for supplying power for operation, during engine shutdown, of an active suspension system powered by a closed center hydraulic system.

In the embodiment shown in FIG. 3, the accumulator charging means 3104 is operatively coupled to a powering means including a mechanical pump driven off of the crankshaft or another rotating shaft operatively coupled to the engine 314 and/or transmission. The powering means may be operatively coupled to (and powered by) either or both of the engine 314 and transmission 316.

In another particular embodiment, the rotating shaft is a shaft of an electric motor powerable by an electrical energy storage means as previously described.

In another particular embodiment, the rotating shaft is a shaft of a generator operatively coupled to the crankshaft or another rotating shaft operatively coupled to the engine 314 and/or transmission.

In a particular embodiment where the pump is driven off the engine crankshaft or another rotating shaft, a variable displacement pump and possibly an electromagnetic clutch may be used. One particular embodiment utilizes a known variable displacement pump with a controllable swash plate. A swash plate control mechanism (not shown) is operatively coupled to the pump for adjusting the swash plate angle. The swash plate angle determines the pump flow rate for a given pump input shaft (or pump driving shaft) rotational speed. In this embodiment, the swash plate angle is controlled as a function of the desired flow rate from the pump (based on the feedback from the accumulator 3102) and the pump input shaft speed, which is a function of the engine speed.

In one particular embodiment, the accumulator pressure feedback and information relating to shaft speed or engine speed are provided to controller 318, which generates a control signal to the swash plate actuation mechanism responsive to the pressure feedback and shaft speed. In another particular embodiment, the accumulator pressure feedback and shaft speed/engine speed information are provided directly to the swash plate control mechanism, which adjusts the swash plate angle responsive to the pressure feedback and shaft speed/engine speed.

In a particular embodiment, the mechanical pump of the accumulator charging means 3104 is operatively and detachably coupled to a rotatable element of the vehicle transmission 316, so that the mechanical pump can be powered by the inertia of the rotating element when the engine 314 is shut down. In another particular embodiment (not shown), rather than a single accumulator supplying pressurized fluid to the all of the actuatable suspension system elements, the vehicle incorporates multiple hydraulic accumulators to supply pressurized fluid to the suspension system. Each accumulator is dedicated to supplying pressurized fluid to a specific portion of the actuatable suspension system elements.

In a known manner, hydraulic flow control means (such as one or more hydraulic valves, for example) (not shown) controls fluid flow between the accumulator(s) 102 and the hydraulically actuatable suspension system elements. Depending on the structures and functions of the actuatable suspension system elements, suitable valving or fluid flow control mechanisms may be incorporated into (or operatively coupled to) individual actuatable elements of the suspension system, to enable control of flow to one or more individual elements by controller 18. In a known manner, feedback indicative of hydraulic pressure, force, or actuator displacement or speed may be provided to the flow control means (or to controller 18 or another controller coupled to the flow control means) by one or more of the hydraulically actuatable suspension system elements, for use in controlling the fluid flow rate.

In a particular embodiment, the system of FIG. 3 also includes an electrical reserve power supply 3136 and an associated charging means (for example, a vehicle alternator or generator 3231) similar to those shown in the embodiment of FIG. 2, for providing power to electrically actuatable suspension system elements when the engine is shut down, in the manner previously described.

Figure 4:
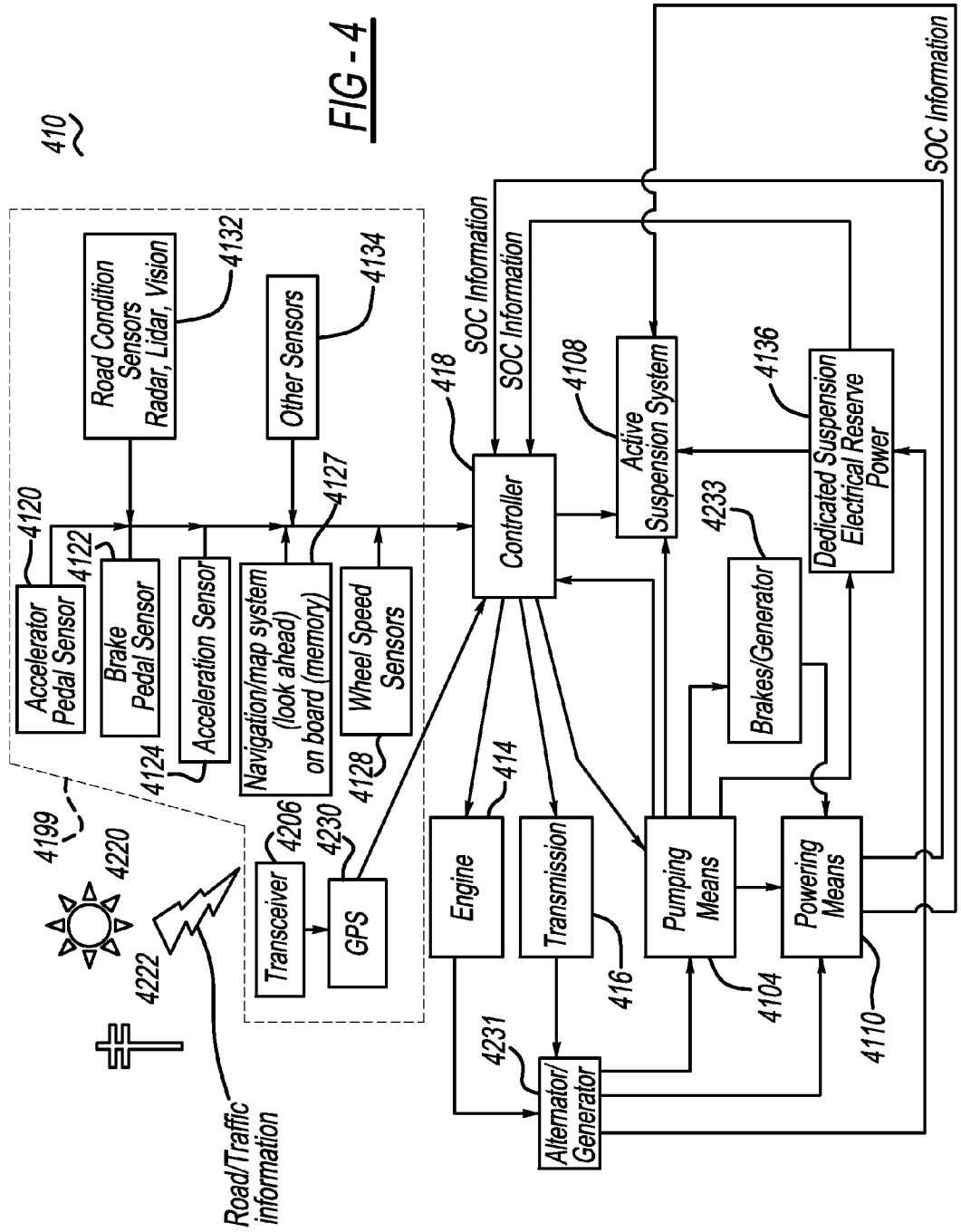
FIG. 4 is a schematic diagram of one embodiment of a system for supplying power for operation, during engine shutdown, of an active suspension system powered by an open center hydraulic system using an electrically-powered pump, in accordance with one embodiment of the present invention.

FIG. 4 is a schematic diagram of a system for supplying power for operation, during engine shutdown, of an active suspension system powered by an open center hydraulic system, in accordance with one embodiment of the present invention. The embodiment shown in FIG. 4 is similar to the embodiment shown in FIG. 2.

In the open center system shown in FIG. 4, the hydraulic accumulator is omitted, and an electrically powered pumping means 4104 is provided for pressurizing the hydraulic system. Embodiments of the pumping means 4104 described herein may also include any valving or other mechanisms or elements needed for operating the charging means in accordance with instructions from an associated controller. The pumping means 4104 is also operatively coupled to a powering means 4110 to provide power for operating the pumping means during engine shutdown and (optionally) also while the engine is running. In one particular embodiment, the powering means 4110 includes a motor/generator operatively coupled to the pumping means 4104 and to engine crankshaft 20 or to another rotating shaft or element of the vehicle (for example, a shaft disengageably coupled to the crankshaft using a clutch or similar mechanism).

The motor/generator may be operatively and detachably coupled to the shaft or a rotatable element of the vehicle that will continue rotating for a period of time after engine shutdown, so that the generator can be powered by the inertia of the rotating element when the engine is shut down. The motor/generator converts energy from the rotating shaft or element to electricity for powering the pump. The pump is configured for pressurizing the hydraulic system for actuation of the hydraulically-actuatable suspension system elements.

In one particular embodiment, the motor/generator 231 is the conventional alternator included in the vehicle. In another particular embodiment, the motor/generator 231 is a separate alternator or generator. In another particular embodiment, the powering means includes an electrical energy storage means (generally designated 4110) similar to storage means 110 shown in FIG. 2 and operatively coupled to the electrically powered pump. The pump receives electric power for pressurizing the hydraulic system from the electrical energy storage means.

The system may also include a suspension electrical power reserve 4136, as previously described with respect to FIG. 2. Power reserve 4136 may be charged by any of all of the same elements as the in the same manner as electrical energy storage means 4110. For example, power supply 4136 may be operatively and detachably coupled (via an alternator/generator 4231, for example) to a rotatable element the vehicle transmission 416, so that the power supply can be energized by the inertia of the rotating element when the engine is shut down. Alternatively, the power supply 4136 may be charged by generator(s) operatively coupled to the vehicle brakes, or by any other suitable means.

It should be noted that certain embodiments of the hydraulically actuated active suspension systems described herein may include some electrically-actuated elements (for example, solenoids) as well as hydraulically-actuated elements. In these embodiments, electrical energy stored in elements such as storage means 110 and reserve power 136, as well as being usable for powering electrically-powered pumps for the hydraulic system, may be used to power the electrically-actuated elements of the suspension system during engine shutdown.

In particular embodiments, the vehicle is provided with a "look ahead" system (generally designated 199, 3199, and 4199 in FIGS. 2, 3, and 4, respectively) operatively coupled to the vehicle controller 18. Referring to the embodiment shown in FIG. 2, for example, the look-ahead system is configured for providing the controller 18 with information and inputs relating to road characteristics ahead of the vehicle and other characteristics of the vehicle surroundings. The "look ahead" system may include any of a variety of sensors configured to detect and convey information relating to criteria affecting an engine shut-down determination. Examples of such sensors include acceleration pedal position sensors 120, brake pedal position sensors 122, a global positioning system (GPS) transceiver 206 for receiving mapping information or road condition information via satellite, vehicle acceleration sensors 124, wheel speed or other vehicle speed-related sensors 128, road condition sensors 132 (such as lidar, vision, or radar sensors), and any other suitable types of sensors (generally designated 134).

GPS coordinates and/or input from sensors or cameras may be used to determine the position of the vehicle relative to any road or traffic condition which may prompt an engine shutdown. The "look ahead" system may also comprise one or more digital maps describing a portion of the road ahead of or near the vehicle. These maps may be stored in a computer memory residing in the vehicle and are configured for use by controller 18 in formulating control commands to the vehicle suspension.

Information received from satellites 220 and/or land-based radio broadcast towers 222 may provide global positioning information processed by a vehicle-mounted GPS unit 230 or other navigation system to identify vehicle position and proximity to various road conditions and characteristics where actuation of one or more elements of the active suspension system may be necessary or desired. In addition, digital maps relating to the road currently being traveled and stored in an on-board vehicle memory may be utilized by controller 18 if available. This information is processed by the controller 18 using stored protocols and control routines to determine the feasibility of executing an engine shut-down over the route currently being traveled by the vehicle.

Information received from, or relative to, various road conditions may be used in combination with current vehicle operating conditions in controlling the automatic shut down and restart of the engine as described in greater detail herein. For example, vehicle 12 may use information from satellites for processing by GPS 230 to determine vehicle position relative to road characteristics (for example, a relatively straight and level stretch of road) along which there is no anticipated need for actuation of the vehicle active suspension, and relative to road characteristics (for example, a curve in the road ahead of the vehicle or an obstacle or piece of debris in the road) along which there is an anticipated need for actuation of one or more elements of the active suspension system responsive to the road conditions.

Operational modes of the embodiments shown in FIGS. 1-4 will now be discussed.

In the embodiments described herein, the vehicle controller (for example, controller 18 of FIG. 2) is configured to execute an engine shutdown under certain predetermined conditions. However, the controller is also configured to prevent the shutdown if there is a perceived need to actuate one or more elements of the active suspension system, and if it is determined that there would be insufficient energy reserves to effect the require actuation (s) if the engine is turned off.

Figure 5:
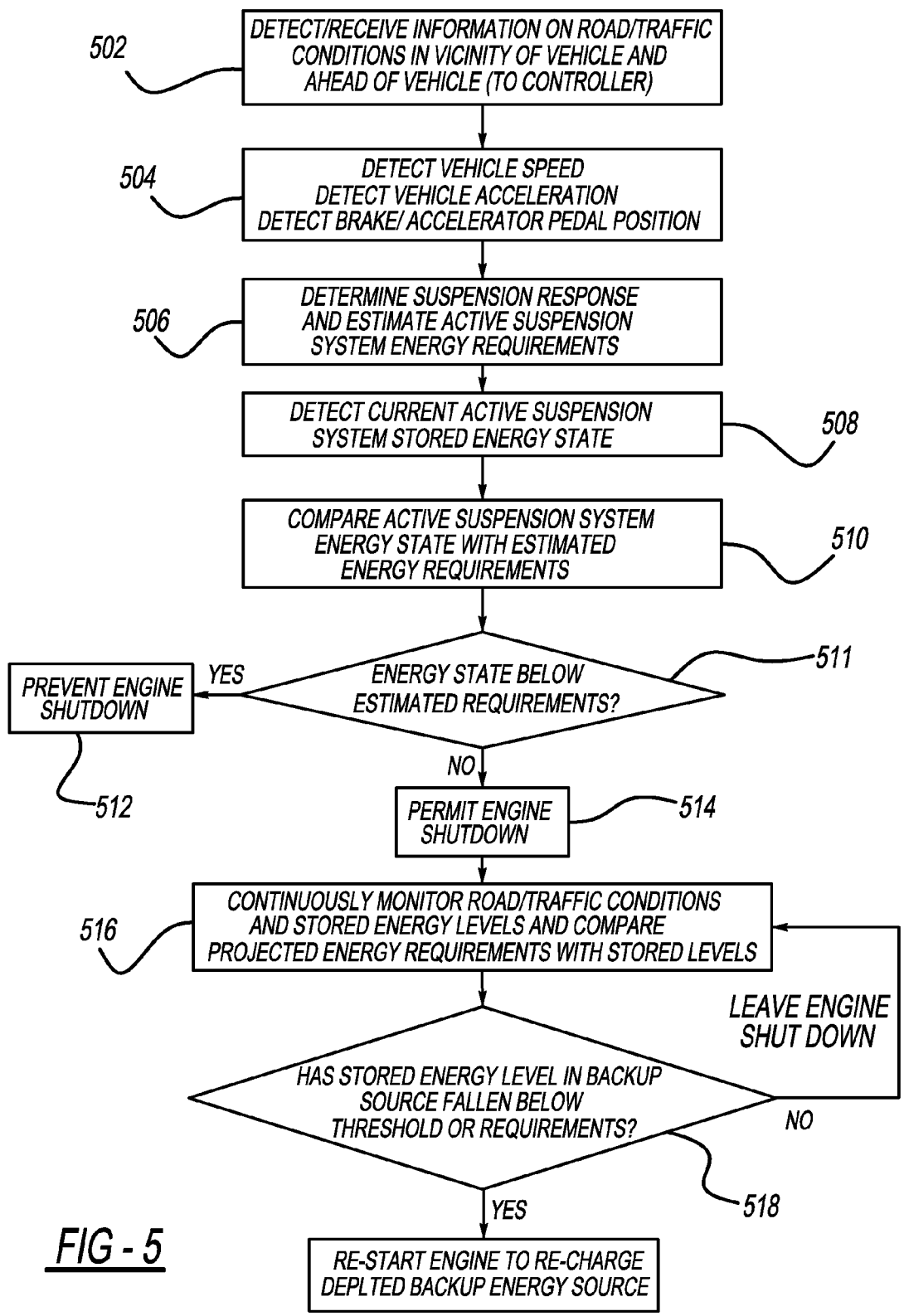
FIG. 5 is a flow diagram illustrating operation of a system or method for supplying power for operation of an active suspension system during engine shutdown, in accordance with one embodiment of the present invention.

FIG. 5 is a flow diagram illustrating operation of a system or method for controlling an engine having an automatic shutdown/restart feature according to the present disclosure. The diagram of FIG. 5 provides a representative control strategy for an internal combustion engine in response to information indicative of a road or traffic condition ahead of or near the vehicle, in which an engine shutdown may be executed in order to conserve fuel. The control strategy and/or logic illustrated in FIG. 5 is generally stored as code implemented by software and/or hardware in controller 18. Code may be processed using any of a number of known strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description.

In one embodiment, the control logic or code represented by the simplified flow diagram of FIG. 5 is implemented primarily in software with instructions executed by a microprocessor-based vehicle, engine, and/or powertrain controller, such as controller 18 (FIG. 1). Of course, the control logic may be implemented in software, hardware, or a combination of software and hardware in one or more controllers or equivalent electronics depending upon the particular application. When implemented in software, the control logic may be provided in one or more computer-readable storage media having stored data representing code or instructions executed by a computer to control one or more components of the engine. The computer-readable storage media may include one or more of a number of known physical devices which utilize electric, magnetic, optical, and/or hybrid storage to keep executable instructions and associated calibration information, operating variables, and the like.

Referring to FIG. 5, in step 502 the vehicle controller 18 receives road/traffic condition information from one or more of the vehicle sensors, from an external system (such as a GPS satellite), from an on-board memory containing road condition information, and/or from any other suitable source, indicating that the vehicle is approaching a portion of the road where (or a traffic condition in which) an engine shutdown would be desirable. An automatic shutdown request may be generated in response to any of a variety of traffic or road conditions. For example, an automatic shutdown request may be generated in response to vehicle wheel speed being below a threshold (or zero) and the brake pedal being depressed for a predetermined period of time, indicating that the vehicle is stationary. The above recitation of conditions prompting an automatic shutdown request is not comprehensive, and numerous other situations are contemplated in which an engine shutdown is desirable.

In step 504, the current vehicle speed, vehicle acceleration, brake and accelerator pedal positions, and any other pertinent vehicle status information is forwarded to controller 18. This information is used (in conjunction with the road/traffic condition information) by the controller 18 to determine when the vehicle will encounter the road or traffic conditions prompting the engine shutdown, enabling a projected start time for the shutdown and a projected restart time for the engine.

In step 506, controller 18 determines a desired response of the active suspension system to perceived road/traffic conditions, and calculates the amount of energy required for the desired response. In an open center hydraulic system utilizing a mechanical pump, the engine must be running to drive the pump, and there is no accumulator to provide a reserve of hydraulic pressure when the engine is shut down. Thus, in this type of system, once a condition is detected where a shutdown would be desirable, if it is determined that pending road or traffic conditions will require a response from the active suspension system during a period when the engine would be shut down, the engine shutdown will be prevented. However, in an open center hydraulic system utilizing an electrical pump, or in a closed center hydraulic system utilizing an electrical pump or a mechanical pump, the engine shutdown may proceed if it is determined that there is enough energy stored in the various energy storage means to actuate the active suspension system in the manner required during engine shutdown.

For example, in step 508, for a closed center hydraulic system using a mechanical pump, the controller 18 inventories the hydraulic energy level in accumulator 102 and the state of charge (SOC) or stored energy levels of any electrical storage means (if the active suspension system has electrically-powered elements) and/or any other energy storage means usable for powering the active suspension system when the engine is shut down, to ascertain if there is sufficient stored energy to execute the desired suspension system response. For a closed or open center hydraulic system using an electrical pump, in step 508, the controller 18 inventories the state of charge (SOC) or energy levels electrical energy storage means 110, accumulator 102, reserve power source 135, and/or any other energy storage means usable for powering the active suspension system when the engine is shut down, to ascertain if there is sufficient stored energy to execute the desired suspension system response. These calculations take into account such factors as the time at which the vehicle will reach the condition prompting shutdown, the road/traffic conditions between the projected shutdown location and the vehicle's current position, the time at which the vehicle will reach any various road/traffic conditions requiring the suspension system response will be reached, any additional energy that may be obtained from residual motion of vehicle elements after the engine is shut down (for example, due to post-shutdown rotation of shafts due to inertia), and other pertinent factors.

Any of a variety of conditions detected by the "look ahead" system may prompt a reconsideration of an engine shutdown. Examples of such conditions might include the detection of a curve in the road that may require the active suspension system to operate with the engine on. If the driver is coasting to a stop and the engine would normally shutdown if the section of road ahead of the vehicle was straight, the engine shutdown may be prevented if a curved section of road is detected ahead of the vehicle, or if there is road construction in progress ahead of the vehicle. For example, if the vehicle incorporates a closed center hydraulic system to actuate the active suspension actuators, the energy required to hold a given vehicle angle during a predetermined handling event can be calculated using known methods if the curvature over a section of road is known. Given this information the controller 18 could choose to allow the engine to shutdown prior to reaching this section of the road if the levels of usable stored energy in the active suspension system backup energy sources/storage means are above a predetermined threshold. If the energy levels are below the threshold, the controller 18 could prevent the engine from shutting down until the suspension system backup supply energy levels had reached at least the first threshold or a second, possibly higher value. Other factors that might affect the decision whether to allow or prevent the engine shutdown include road conditions (wet vs. dry, paved vs. gravel, etc.) which may impact vehicle handling and the energy requirements of the active suspension system. A suitable safety factor may be applied to the energy calculations. That is, the system may require sufficient stored energy to meet estimated suspension system needs, plus an additional amount of stored energy to account for possible errors in the estimated requirement.

In step 510, based on the energy calculations executed in step 508, the controller determines whether an engine shutdown will be permissible where and when it is deemed desirable. In one embodiment, the projected energy levels in each energy storage means is compared with the total projected energy demands of all of the actuatable suspension system elements serviced by the particular energy storage means to determine if there is sufficient stored energy to meet the requirements.

In step 511, if it is determined that an engine shutdown is undesirable at the desired time and/or location due to insufficient energy for affecting the desired suspension responses, the shutdown is prevented (step 512). However, if it is determined that sufficient energy reserves are present (or will be present when needed), the shutdown is affected at the desired time and location (step 514).

Figure 6A:
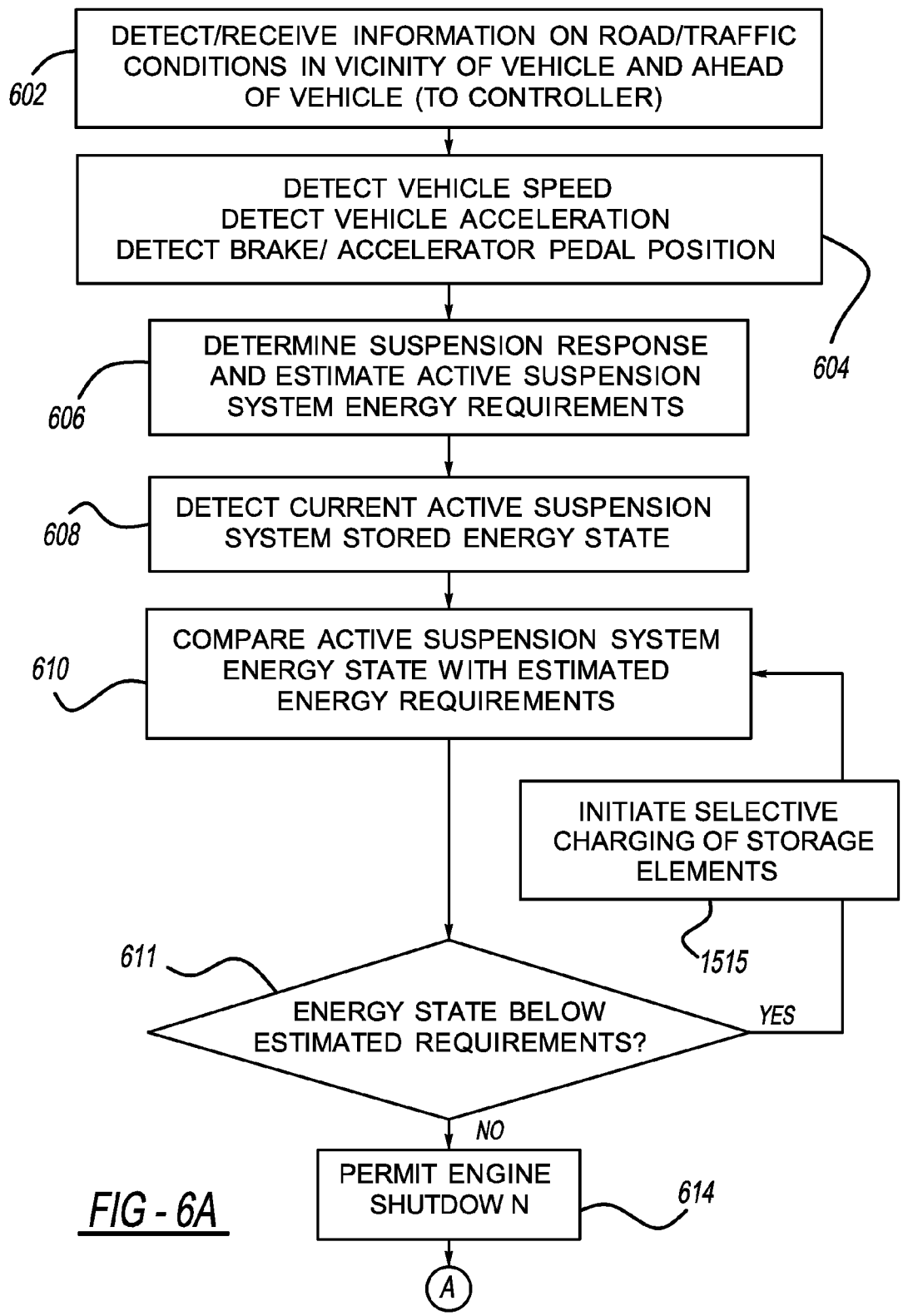
FIGS. 6A and 6B show a flow diagram illustrating operation of a system or method for supplying power for operation of an active suspension system during engine shutdown, in accordance with another embodiment of the present invention.
Figure 6B:
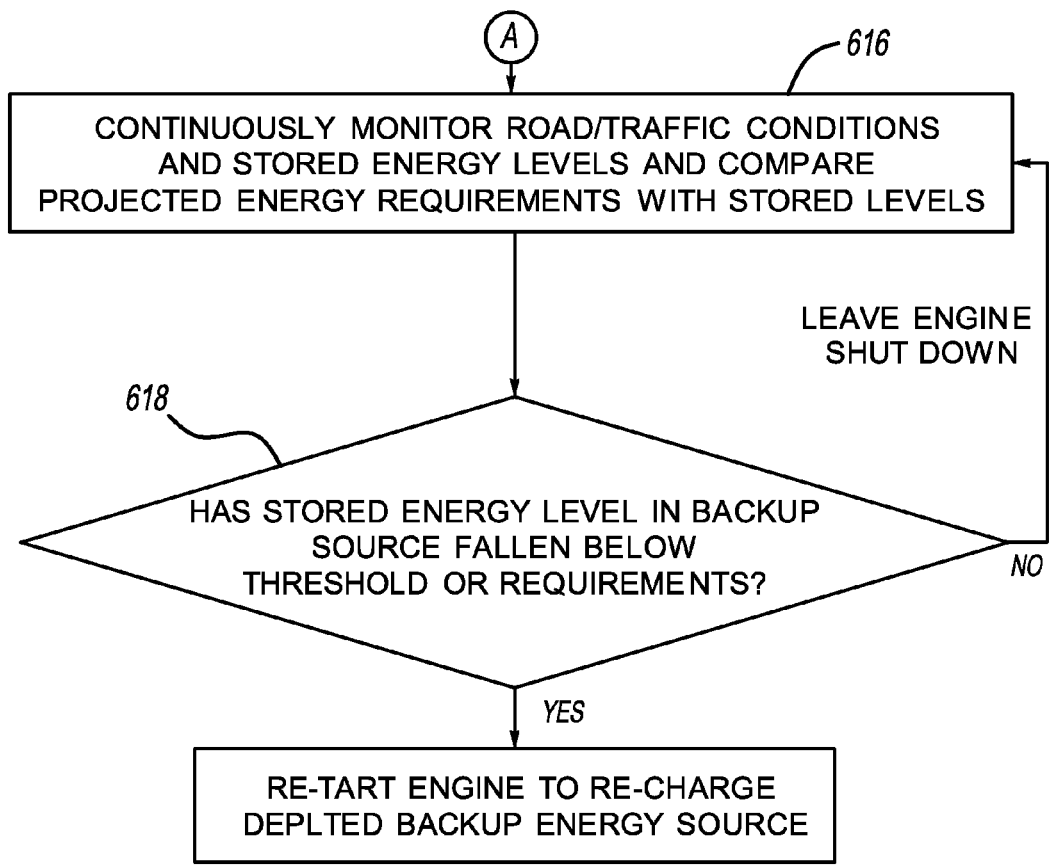

Referring to FIG. 6, in an alternative embodiment, if it is determined in step 511 that the energy requirements of the actuatable elements during shutdown exceed the necessary stored energy levels, the various backup mechanisms for powering the active suspension system during engine shutdown are selectively powered or charged in step 1515, so that each backup mechanism has sufficient power for its estimated needs. The process then branches back to step 510 to update the comparison between the required and stored energy states. This sub-routine continues until there it is determined that there is sufficient energy to meet the projected requirements. At this point, engine shutdown can proceed in step 514.

In a particular embodiment, when it is determined what the desired suspension system response is to a particular set of conditions, and which particular actuatable elements will be required for the desired suspension response during an engine shutdown, the various energy sources (comprising accumulators, capacitors, etc.) needed for powering these required suspension system elements are selectively powered or charged, so that each energy source for which a need is foreseen has sufficient power to power its associated suspension elements during engine shutdown. For example, if an upcoming turn to the left is required, then the accumulator(s) or other backup energy sources that supply the suspension system actuators on the right (or opposite) side of the vehicle may require more energy to accommodate the lateral acceleration-based load shift.

The energy sources selected for charging may be based on such factors as the backup powering scheme in use for powering a particular actuator (or actuators), the amount of usable energy already stored in the pertinent energy sources, and any energy distribution priorities of the energy sources, as well as the estimated energy requirements of the actuators and other pertinent factors. For example, in a system using the backup powering scheme shown in FIG. 7A, if a particular actuator may be powered by either of two backup energy sources, and a first one of the sources has a higher stored energy level than the second source, the first source may be selected for charging because it will take less time and energy to charge the first source to the required energy level for use by the actuator.

In step 516, after the engine has been shut down, road/traffic conditions are monitored by the "look ahead" system. This information is forwarded to controller 18, which updates the estimated energy requirements of the active suspension system based on the appropriate responses of the suspension system to the perceived road/traffic conditions. Simultaneously, the suspension system backup energy level sources are monitored by controller 18. The controller continuously compares the energy levels in each backup energy source with the estimated energy requirements for the particular backup source, to determine if the engine shutdown is maintainable.

In step 518, when the stored energy level in any one of electrical energy storage means 110, accumulator 102, dedicated suspension reserve electrical power source 136, and/or any other source of stored energy for the system has fallen below a predetermined level (for example, below the projected energy requirement of the active suspension system elements powered by the given energy source), the engine is restarted and run for at least a time sufficient to re-charge the backup energy source (or sources) in question, to a level sufficient to meet requirements or to a predetermined threshold level.

For example, if the energy state of any of storage means 110, reserve power 136, or accumulator 102 falls below the projected energy requirements for the respective means/device, or below a predetermined energy threshold for the respective means/device, the engine can be re-started to recharge the means/device to the required energy level. Restart of the engine may be timed taking into account the required recharge time for a given mode of charging, the characteristics of the energy storage means, and other pertinent factors, so that the stored energy level of a given energy storage means does not fall below some desired predetermined threshold.

Thus, in the embodiments of the control system described herein, engine shutdown may be maintained even under conditions where the engine would normally be restarted due to the need to power actuatable elements of the active suspension system, provided the reserve hydraulic and electrical power sources are sufficiently charged to meet or exceed the estimated energy requirements of the suspension system while the engine is shut down.

As long as there are sufficient energy reserves to power the active suspension system as required for response to the detected road/traffic conditions, restart of the engine may be deferred until there is a need to use engine power to actuate the active suspension system (for example, when suspension system energy reserves fall below a predetermined threshold or below the projected requirements for response to road/traffic conditions). This allows the engine control system to extend the engine off periods when no active suspension operation is required, leading to improved fuel economy of the integrated system. Therefore, by using the methods described above for mechanically and electrically actuated active suspension systems, the active suspension system operation and the ADS system operation may be integrated in a manner that maintains active suspension system performance while optimizing the fuel saving potential of the ADS system.

In particular embodiments of the systems described herein, the various backup mechanisms for powering the active suspension system during engine shutdown are maintained at least a predetermined threshold power level while the engine is running, in case these backup power systems are needed. The power systems may be maintained at their respective maximum levels, if desired.

It will be understood that the foregoing descriptions of various embodiments of the present invention is for illustrative purposes only. As such, the various structural and operational features herein disclosed are susceptible to a number of modifications, none of which departs from the scope of the present invention as defined in the appended claims.

What is claimed is:

1. A system for controlling an internal combustion engine, the system comprising:
engine shutdown/restart means; and
a controller configured for controlling the shutdown/restart means so as to selectively charge at least one energy source operatively coupled to the engine, the at least one energy source being configured for powering an associated at least one actuatable element of a plurality of actuatable elements of an associated vehicle active suspension system when the engine is shut down.

2. The system of claim 1 wherein the energy storage means comprises at least one hydraulic accumulator.

3. The system of claim 2 further comprising an accumulator charging means operatively coupled to the accumulator for pressurizing the hydraulic fluid stored in the accumulator.

4. The system of claim 3 wherein the accumulator charging means comprises an electrically powered pump.

5. The system of claim 3 wherein the accumulator charging means comprises a mechanically powered pump.

6. The system of claim 1 wherein the energy storage means comprises at least one battery.

7. The system of claim 1 wherein the energy storage means comprises at least one ultracapacitor.

8. The system of claim 1 wherein the shutdown/restart means is configured to shut down the engine responsive to detection of at least one first predetermined condition, and is also configured to restart the engine responsive to detection of at least one second predetermined condition following the at least one first predetermined condition.

9. The system of claim 1 wherein the energy storage means is operatively coupled to the engine so as to be chargeable by running of the engine.

10. The system of claim 1 further comprising a look ahead system operatively coupled to the controller and configured for providing the controller with information usable for determining the desired suspension system response.

11. The system of claim 1 wherein the controller is further configured for:
determining a desired suspension system response;
determining which at least one actuatable element of the plurality of actuatable suspension system elements would be required to provide the desired response during an engine shutdown;
determining an estimated energy needed by the at least one required actuatable element to provide the desired response during the engine shutdown; and
responsive to the estimated energy needed, controlling the shutdown/restart means so as to selectively charge the at least one energy source to at least a level required to provide to the at least one required actuatable element the estimated energy needed to provide the desired response during the engine shutdown.

12. A system for controlling a vehicle active suspension system during engine shutdown, comprising:
an energy storage means structured for powering actuation of the active suspension system during shutdown;
a dedicated electrical reserve power supply, separate from the energy storage means and structured to power actuation of the suspension system during shutdown; and
a controller operatively coupled to the energy storage means and to the dedicated reserve power supply, the controller being configured for controlling an energy flow from the energy storage means and from the dedicated reserve power supply to the suspension system during shutdown.

13. The system of claim 12 further comprising an engine shutdown/restart means, and wherein the controller is configured for controlling the shutdown/restart means responsive to an energy state of the energy storage means.

14. The system of claim 12 further comprising an engine shutdown/restart means, and wherein the controller is configured for controlling the shutdown/restart means responsive to an energy state of the dedicated electrical reserve power supply.

15. A method for controlling a vehicle active suspension system during engine shutdown, comprising steps of, by a controller:
- determining an estimated energy requirement of the suspension system during shutdown;
- determining a stored energy state of the vehicle;
- comparing the estimated requirement to the stored energy state; and
- controlling shutdown of the engine responsive to a difference between the estimated requirement and the stored energy state.

16. The method of claim 15 wherein the step of controlling shutdown of the engine comprises the step of preventing an engine shutdown when the estimated energy requirement is greater than the stored energy state.

17. The method of claim 15 wherein the step of controlling shutdown of the engine comprises the step of permitting an engine shutdown when the estimated energy requirement is less than the stored energy state.

18. The method of claim 17 wherein the step of controlling shutdown of the engine further comprises the step of, after the engine has been shut down, leaving the engine shut down until the estimated energy requirement is greater than the stored energy state.

19. The method of claim 15 further wherein the step of determining an estimated energy requirement of the suspension system during shutdown comprises the steps of:
  a) determining which at least one actuatable suspension system element of a plurality of actuatable suspension system elements is required for a given response of the suspension to a condition ahead of the vehicle; and
  b) determining an estimated energy requirement of each required actuatable suspension system element to execute a respective portion of the given response; and
wherein the step of determining a stored energy state of the vehicle comprises the step of determining a stored energy state of each energy source configured to supply energy to one or more of the required actuatable suspension system elements;
wherein the step of comparing the estimated requirement to the stored energy state comprises the step of, for each of the required actuatable suspension system elements, comparing the estimated energy required by the required system element to the stored energy available to the required element;
and wherein the method further comprises the step of selectively charging, responsive to the comparison, each energy source configured to supply energy to one or more of the required actuatable suspension system elements.

* * * * *